Feb. 9, 1943.  A. C. ROBERTSON  2,310,871
METHOD AND APPARATUS FOR STUDYING THE POLLUTION OF ATMOSPHERES
Filed April 7, 1939
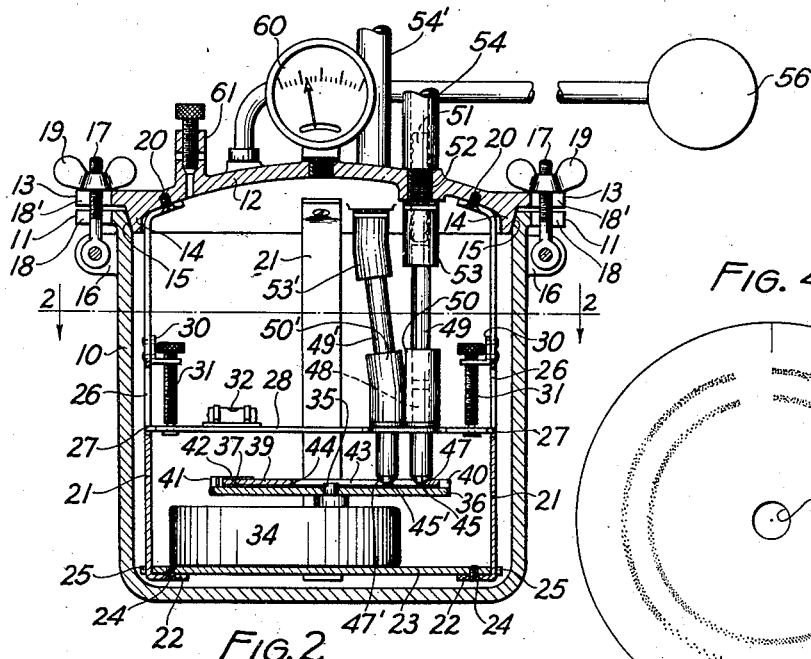
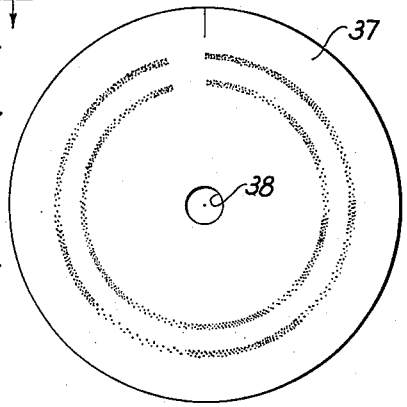
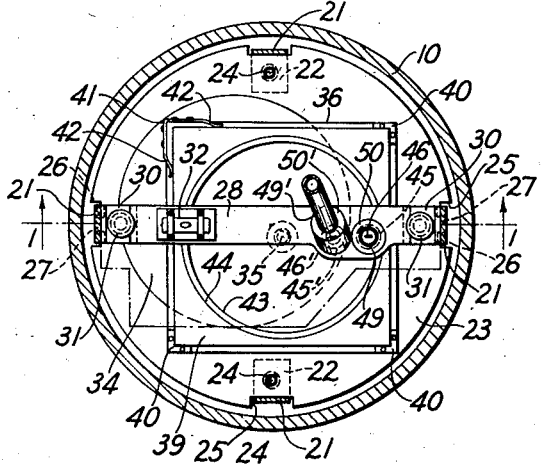
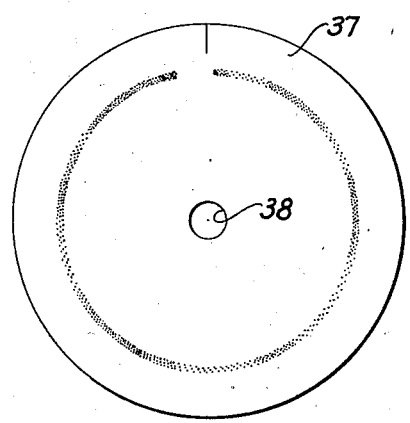
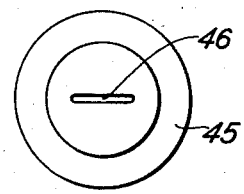
ALFRED C. ROBERTSON
INVENTOR
BY
ATTORNEYS Patented Feb. 9, 1943

2,310,871

UNITED STATES PATENT OFFICE 2,310,871

METHOD AND APPARATUS FOR STUDYING THE POLLUTION OF ATMOSPHERES

Alfred C. Robertson, Rochester, N. Y., assignor to Eastman Kodak Company, Rochester, N. Y., a corporation of New Jersey Application April 7, 1939, Serial No. 266,586

12 Claims. (Cl. 73—51)

The present invention relates to a method and apparatus for recording the amount of dirt and smoke in an atmosphere for studying the cleanliness of such atmosphere, and particularly to a method and apparatus adapted for making a continuous record over a relatively long period of time, by the use of which the cleanliness of two or more different atmospheres can be determined and compared simultaneously, as well as by means of which a single atmosphere can be studied.

Known methods and apparatus for determining and recording the amount of dirt in an atmosphere comprise making single samples at regular or irregular intervals. These methods and apparatus have been found to be rather laborious and to involve a number of operations. Further, such known methods and apparatus have not been adapted for making simultaneous dirt recordings of two or more different atmospheres in a manner so that they can be readily visibly compared.

Therefore, one object of the present invention is to provide a method and apparatus for making continuous dirt and smoke recordings of an atmosphere. Another object is the provision of a method of making a continuous dirt and smoke recording which comprises forcing the atmosphere to be studied through a restricted nozzle at high velocity and impinging the same onto an impregnable recording disk with such force that the solid material contained in the atmosphere is impregnated into the surface of the recording disk in the form of a continuous trace varying in density as the amount of solid material in the air varies. And another object is to cause the atmosphere to flow through a nozzle at a high velocity by reducing and maintaining the pressure at the orifice of said nozzle substantially below the pressure of the atmosphere being studied. And yet another object is to impinge the atmosphere to be measured onto said recording disk with such force that the solid material entrained in the atmosphere is impregnated into the surface of the recording disk so that it will appear as a sharp line conforming to the shape of the nozzle orifice, and which line will not be subject to smearing should it be wiped with the fingers. And still another object is to provide an apparatus for carrying out the above-described method. And a further object of the invention is to provide such an apparatus which is simple in construction, cheap to manufacture, and one that is portable so that it can be readily moved to and from places the cleanliness of the atmosphere of which it is desired to study.

The novel features that I consider characteristic of my invention are set forth with particularity in the appended claims. The invention itself, however, both as to the steps of the method, and the apparatus for carrying out such a method, together with additional objects and advantages thereof, will best be understood from the following description of the method and a specific embodiment of the apparatus for carrying out such a method when read in connection with the accompanying drawing in which, Fig. 1 is a vertical section showing the preferred form of the smoke and dirt recorder in accordance with the present invention, and taken substantially on line 1—1 of Fig. 2, Fig. 2 is a section taken substantially on line 2—2 of Fig. 1, Fig. 3 is a plan view of the nozzle orifice showing one, and a preferred, shape thereof, Fig. 4 is a plan view of a recording disk removed from the recording apparatus after the solid material entrained in two different atmospheres has been recorded thereon, and Fig. 5 is a plan view of a recording disk removed from the apparatus after the solid material of only one atmosphere has been recorded thereon.

Like reference characters refer to corrsponding parts throughout the drawing.

The method of recording smoke and dirt in an atmosphere, and which constitutes a part of the present invention, can be most clearly set forth by describing the apparatus for carrying out said method. Therefore, the apparatus disclosed in the drawing, which by the way illustrates one embodiment of a suitable apparatus for carrying out the novel method, will be described, and from this description the method constituting a part of the present invention will be clearly and fully set forth.

Referring now to Figs. 1-3, the smoke and dirt recording apparatus comprises a circular open ended chamber 10 having a flange 11 encircling and extending horizontally outward from the open end thereof. The open end of the chamber 10 is adapted to be closed by a removable cover 12 having a horizontally extending flange 13 adapted to overlie the flange 11 on the chamber, and having an inwardly extending flange 14 tapered as shown to engage an outwardly tapered wall 15 around the open end of the chamber 10 to form an air-tight fit between the cover and the chamber. The upper end of the chamber may include two or more diametrically spaced lugs 16 to which are pivoted clamp bolts 17. These clamp bolts are adapted to swing into and out of aligned slots 18 and 18' in the flanges 11 and 13, and include wing nuts 19 which when turned down, when the clamp bolts are in their locking position, see Fig. 1, act to draw the cover 12 down against the top of the chamber to force the flange 14 on the cover down against the tapered wall 15 around the open end of the chamber.

Fixed to the under side of the cover 12 by any suitable means such as screws 20, are four brackets 21 spaced 90 degrees apart, and these brackets extend vertically from the under side of the cover and have their lower ends turned up, as shown at 22. A circular supporting plate 23 is supported on the turned up ends of the brackets and fastened thereto by screws 24. This supporting plate may be provided with slots 25 spaced 90 degrees apart around its periphery, each of which slots is adapted to receive one of the brackets 21 to aid in properly locating the supporting plate relative to parts carried by the cover, which parts will be hereinafter fully described. One pair of diametrically spaced brackets 21 are provided with elongated slots 26 into which projections 27 on the ends of the cross-member 28 extend to mount said cross-member for adjustment vertically of the brackets. To each of the slotted brackets 21 is fixed a threaded angle 30 in threaded engagement with which there is an adjusting screw 31 fixed to either end of the cross-member 28. Therefore, by adjusting the two adjusting screws 31 the cross-member 28 may be moved vertically of the bracket 21 for the purpose hereinafter described. A liquid level 32 may be mounted on the cross-member 28 to indicate when the cross-member is properly adjusted to a horizontal position.

Mounted on the supporting plate 23 in any suitable manner and below the cross-member 28 is a 24-hour clock mechanism 34 the driven shaft 35 of which supports and extends slightly through table 36 which is to be rotated with said shaft. An impregnable recording disk 37, see Figs. 4 and 5, is adapted to be placed flat on said table and be located thereon by passing the end of the shaft 35 extending above said table through an aperture 38 in the center of the disk. The disk is removably held flat against the top of the table by a holding plate 39 which is adapted to be forced against three corner brackets 40, fixed to three corners of the table and extending above the top thereof a distance equal or slightly greater than the thickness of the holding plate 39, by an angular spring member 41 located at the fourth corner of the table and having two spring arms 42 each of which is adapted to engage the edges of the holding plate adjacent the fourth corner thereof, as clearly shown in Fig. 2. This particular locating and retaining means for the holding plate definitely locates the same on top of the table, and provides a locating means therefor by means of which the holding plate can be readily slipped into and out of place for permitting exchange of the recording disk 37. The holding plate 39 is provided with a circular opening 43 which is concentric with and of slightly smaller diameter than the recording disk, the edge of the holding plate surrounding said opening being tapered outwardly as shown at 44, and for the purpose hereinafter described.

Fixed to the cross-member 28 to move therewith are a pair of nozzles 45 and 45' each provided with a slot-like orifice 46, as shown in Fig. 3. The lower edge of each nozzle is tapered inwardly, as shown at 47, at an angle complementary to the taper 44 around the aperture in the holding plate 39 so that the nozzle adjacent the edge of the opening 43 can be brought as close as possible thereto, whereby the orifice of said nozzle 45 will be adjacent the edge of the opening 43. It is desirable to have the orifice of the outside nozzle 45 as close to the edge of the opening 43 in the plate 39 as possible, in order to get a recording trace of dirt as great in circumference as possible. The nozzles 45 and 45' are spaced radially of the recording disk 37, as shown, so that the recordings of the two will be made simultaneously and side by side for easy comparison, as shown in Fig. 4 where a record of this type is illustrated. So that the two recorded traces of the two nozzles will be as close together as possible for purposes of comparison, the nozzle 45' is positioned adjacent nozzle 45 as close as possible to bring the orifices of the two into close relation. The nozzles are located on the cross-member 28 so that the orifices thereof will extend lengthwise radially of the recording disk.

The entrance of each of the nozzles 45 and 45' is adapted to be in communication with different atmospheres the cleanliness of each of which is to be determined and compared, and since the arrangement shown for placing each of the nozzles in communication with an atmosphere is the same, the arrangements for one nozzle will be described and corresponding parts for the other nozzle will be referred to by corresponding numerals primed ('). Referring to Fig. 1, the nozzle 45 has an entrance 48 extending above the cross-member 28, and a section of solid tubing 49 of the same diameter as the entrance of said nozzle is connected to said entrance by a tubular sleeve 50 which can be slid upon the tubing 49 to permit this joint to be broken. A double ended nipple 51 is screwed into a tapped opening 52 in the cover 12 and the tubing 49 is connected to the end of the nipple 51 extending into the chamber 10 by a second tubular sleeve 53 which permits of this joint being broken as will be readily understood. A flexible tubing 54, such as rubber, is slipped onto the end of the nipple extending above and to the outside of the cover 12, and serves to complete the conduit from the atmosphere to be measured to the nozzle 45. The particular separable conduit described for connecting the nozzle 45 to the atmosphere to be measured is provided to permit the ready replacement of the nozzle or nipple, as well as to permit exchange of the recording disk as will be hereinafter described, but it is to be understood that said conduit could be fabricated in any suitable manner so long as the passage of the same through the cover 12 was made air tight. The tubings 54 and 54' forming a part of the conduit to the nozzles 45 and 45' may be relatively long to permit of one being placed in the atmosphere of one room at the same time the other is placed in the atmosphere of another room.

To cause the atmosphere with which each nozzle 45 and 45' is in communication to flow through the orifices of said nozzles at high velocity, the air-tight chamber 10 is evacuated by a suitable water aspirator or vacuum pump 56 until the pressure in said chamber is substantially below that of the pressure of the atmospheres being studied, and the pump or aspirator operates to maintain this pressure difference. This difference of pressure in the chamber and the atmosphere being measured causes said atmosphere to flow into said chamber through the nozzles 45 and 45', and the restricted orifices 46 of said nozzles cause the air to be impinged at high velocity onto the recording disk on the table. The recording disk is made of an impregnable material so that when the atmospheres are impinged thereon at high velocity, virtually all of the entrained solid material in the atmospheres will be left behind on the recording disk. An example of an impregnable disk which has proven highly satisfactory is Whatman filter paper No. 50. It is to be understood that the impinging atmospheres do not pass through the impregnable disk to have the entrained solid material filtered out in the known sense in which filter paper is ordinarily used, but, since the filter paper is on a solid surface the impinging air after striking the disk bounds back and the entrained solid material is literally driven right into the disk to leave a trace behind, as shown in Figs. 4 and 5. Throughout the specification and claims the word "impregnable," as used in defining the character of the recording disc, is intended to mean "capable of being impregnated" as distinguished from its other definition "incapable of being impregnated."

It is desirable for several reasons to reduce and maintain the pressure in the chamber 10 so that the pressure drop between the atmosphere being studied and the interior of the chamber is equal to, or more than, .53 of an atmosphere, assuming of course that the atmosphere is at atmospheric pressure. One reason for maintaining this particular pressure drop is that, due to a well-known principle of the flow of fluids through orifices, a slot-like orifice delivers air at a constant rate independent of the pressure drop when the pressure drop is equal to, or more than, .53 of the pressure of the atmosphere at the entrance side of the orifice. Therefore, if the atmosphere being analyzed is at atmospheric pressure (14.7 lbs. per sq. in.) under which conditions the apparatus is generally used, the pressure drop required across the nozzle would be .53 of 14.7 lbs. per sq. in. and which pressure is known as an atmosphere. This means that the device needs no elaborate metering equipment so that the orifice acts both as a meter and a recorder, and also means that the chamber may be evacuated by a motor driven pump of the simplest kind or, preferably by a water aspirator. Other advantages to be obtained by evacuating the container to give this pressure drop is that the velocities obtained in the moving jet of air are so high that the solid material entrained in the air is impregnated into the disk and hence leaves a clear trace upon it. It might be pointed out that if the pressure of the atmosphere being analyzed is other than atmospheric (14.7 lbs. per sq. in.) then the pressure drop across the orifice would have to be .53 of the pressure of the atmosphere being analyzed.

The cross-member 28 is adjusted by screws 31 to bring the orifices 46 of the nozzles 45 and 45' close to the recording disk 37 to insure a clear sharp trace upon the disk. It has been found that if the orifices are spaced approximately 0.025" of an inch from the recording disk that a very sharp trace will be left upon the disk, and which trace, due to the fact that the solid material of the air is driven into the disk, will not be easily smudged. The adjusting screws 31 in addition to serving to adjust the orifices of the nozzle toward the disk for most efficient operation, also serve to retract the cross-member 28 and nozzles mounted thereon from the table to allow the disk 37 to be exchanged on the table. The distance the orifices of the nozzles are from the disk 37 is not too critical, but if this distance is made too great, the trace on the disk will show a "halo" effect due to the fact that the stream of air from the orifice has a chance to spread before striking the surface of the disk. A suitable orifice has been found to be about .005 inch wide and .044 inch long. At a pressure drop equal to, or more than, .53 of an atmosphere, when atmosphere at atmospheric pressure is being analyzed, such a nozzle will pass about .06 cubic feet of air per minute, which represents about ½ or ⅓ of the capacity of a small size water aspirator, and the air will be impinged upon the recording disk at the velocity of sound, or at 1000 feet per second. The chamber 10 may be provided with a known type of pressure gage 60 in communication with the interior thereof for indicating the pressure inside of the chamber, and may be provided with a port 61 which is opened to admit air into said chamber prior to removing the cover 12 therefrom.

When the desired pressure drop is maintained, the atmosphere to be studied will flow constantly from its respective nozzle and onto the recording disk. Now if the 24-hour clock mechanism is started, the disk will be rotated continuously past said nozzle at a constant rate and the solid material entrained in the atmosphere will be impregnated into the disk in the form of a pair of continuous circular traces in side by side relation, as shown in Fig. 4. The different densities of the traces indicate the different amounts of solid material entrained in the atmospheres at different times of the day, and by marking the disk off in the manner of a clock face, not shown, the amount of dirt at any particular hour of the day could be noted. In addition to these traces giving a visual comparison of the cleanliness of different atmospheres, the individual traces could be measured by a densitometer and compared against densitometer readings of traces of air the cleanliness of which was known, or standards, to obtain a determination of the amount of dirt in the air being measured.

It will be readily appreciated that the number of different atmospheres which could be simultaneously studied is limited only by the size of the apparatus. For example, if only one atmosphere is to be measured, then the conduit to nozzle 45' could be cut off by a suitable valve in the conduit outside the chamber not shown, whereupon only one trace would appear on the disk 37, as shown in Fig. 5. The invention is not limited to the use of a rotating disk giving a circular trace, but to obtain long time records, 48 hours or more, the drive between the clock mechanism and the disk could be such as to give a spiral trace.

Should it be desired to measure an atmosphere containing coarse particles, or light particles, such as lint, etc., which particles would not be impregnated into the recording disk, a disk having a tacky surface could be used to collect such particles. The velocity of the impinged air under these conditions need not be as great as where the entrained solid material is of such character as to be impregnated into the recording disk.

The disclosed method and apparatus for continuously recording the amount of solid material contained in an atmosphere is carried out and operated as follows: First the cover 12 is removed from the chamber 10 and with it the mechanism supported by the brackets 21 fixed to said cover. Next the cross-member 28 and the nozzles 45 and 45' carried thereby, after breaking the conduits to said nozzles, are moved away from the top of the table 36 by adjustment of screws 31. Then the holding plate 39 is removed from the table and the recording disk 37 placed upon the top of said table after which the holding plate is replaced to hold said disk in place. Then the cross-member 28 is adjusted toward the table until the orifices of the nozzles are suitably spaced from the disk 37, after which the conduits to the nozzles are connected, and the cover replaced and clamped on the chamber. The water aspirator 56 is now started, and when the chamber is evacuated to give and maintain a pressure drop equal to or greater than .53 of the pressure of the atmosphere being analyzed between the interior of the chamber and the atmosphere being studied, tubings 54 and 54' of the respective nozzles 45 and 45' are placed in the atmospheres to be measured and the clock mechanism is started. The atmosphere, due to the pressure drop, will flow through the nozzles at high velocity and will be impinged onto the disk with such force that the solid material entrained therein will be impregnated into the disk in the form of a trace due to the disk being moved past said orifice.

The disclosed method and apparatus provides a simple and efficient way of determining and comparing the amount of solid material entrained in one or more atmospheres. It gives a continuous record without personal attention of an operator, and a record which is clear and sharp, and not subject to smudging. The method is such that an apparatus for carrying it out is simple in construction, cheap to manufacture, efficient in operation, and readily portable to different places of use.

Although I have shown and described a specific embodiment of my invention, I am fully aware that many modifications thereof are possible. My invention, therefore, is not to be restricted except insofar as is necessitated by the prior art and by the spirit of the appended claims.

Having thus described my invention, what I claim is new and desire to secure by Letters Patent of the United States is:

1. An apparatus for determining the amount of solid material polluting an atmosphere comprising an air-tight chamber, a table movably mounted therein, a record disc on said table, and having an impregnable, non-tacky surface, a nozzle in said chamber with its orifice adjacent said surface of the recording disc and its entrance in communication with said atmosphere to be measured, means for evacuating said chamber to obtain and maintain a pressure drop through said nozzle equal to, or greater than, .53 of the pressure of said atmosphere; whereby said atmosphere is caused to flow through said nozzle at the velocity of sound through said atmosphere to be impinged against said surface of the recording disc with such force that the solid material contained therein is impregnated into the surface of said recording disc, and means for moving said recording disc past said nozzle at a constant rate.

2. An apparatus for determining the amount of solid material polluting an atmosphere comprising, a chamber, a removable cover for said chamber and adapted to make said chamber airtight when placed thereon, a table rotatably mounted in said chamber, means for rotating said table at a given speed, a recording disc mounted on said table to move therewith, and having an impregnable-non-tacky surface, a nozzle adjustably mounted in said chamber with its orifice adjacent said surface of the recording disc, means for adjusting said nozzle relative to said table, means for connecting the entrance of said nozzle with the atmosphere to be measured, and means for evacuating said chamber to obtain and maintain a pressure drop through said nozzle equal to, or greater than, .53 of the pressure of said atmosphere; whereby said atmosphere is caused to flow through said nozzle at the velocity of sound through said atmosphere to be impinged against said recording disc with such force that the solid material contained therein is impregnated into said surface of the recording disc to provide a sharp edged trace which is highly resistant to smudging.

3. An apparatus for determining the amount of solid material polluting an atmosphere comprising, a chamber, a removable cover for said chamber and adapted to make said chamber airtight when placed thereon, supporting means fixed to and extending downwardly from the underside of said cover and adapted to extend into said chamber when the cover is placed thereon, a rotatable table and means for rotating the same at a given speed carried by said supporting means, an impregnable recording disc detachably mounted on said table to move therewith, a nozzle adjustably mounted on said supporting means with its orifice adjacent said recording disc, means for adjusting said nozzle toward and away from said recording disc, a conduit connecting the entrance of said nozzle with the atmosphere to be measured and supported by said cover to be movable therewith, and means for continually evacuating said chamber to reduce, and maintain, the pressure therein at, or less than, .53 of the pressure of the atmosphere to be measured, whereby said atmosphere is caused to flow through said nozzle at the velocity of sound through said atmosphere to be impinged against said recording disc with said force that the solid material contained therein is impregnated into said recording disc.

4. An apparatus for determining the amount of solid material polluting an atmosphere comprising, a chamber, a removable cover for said chamber and adapted to make said chamber airtight when placed thereon, supporting means fixed to and extending downwardly from the underside of said cover and adapted to extend into said chamber when the cover is placed thereon, a clock mechanism supported by said supporting means, a rotatable table supported and driven by said clock mechanism, a cross-member supported by and adjustable vertically of said supporting means above said table, an impregnable recording disc detachably mounted on said table to move therewith, a nozzle carried by said cross-member with its orifice directed onto said recording disc at a point radially of said disc, means for adjusting said cross-member vertically of said supporting means to bring the orifice of said nozzle adjacent said recording disc, a conduit connecting the entrance of said nozzle with the atmosphere to be measured and supported by said cover to be movable therewith, and means for continually evacuating said chamber to reduce and maintain the pressure therein at or less than .53 of the pressure of the atmosphere to be measured, whereby said atmosphere is caused to flow through said nozzle at the velocity of sound through said atmosphere to be impinged against said recording disc with such force that the solid material contained therein is impregnated into said recording disc.

5. An apparatus for quantitatively determining the amount of solid material polluting two different atmospheres and for comparing the amount of pollution in each, comprising an airtight chamber, a table movably mounted therein, a recording disc detachably mounted atop said table to move therewith, and having an impregnable, non-tacky, surface, a nozzle in said chamber with its orifice adjacent and directed toward said surface of the recording disc, and having its entrance in communication with one atmosphere to be measured, a second nozzle in said chamber with its orifice adjacent and directed toward said surface of the recording disc and its entrance in communication with a second atmosphere to be measured, said second nozzle located adjacent said first nozzle whereby the orifices of the two are directed onto said recording disc in side by side relation radially of said disc, means for continually evacuating said chamber to reduce and maintain the pressure therein equal to, or less than .53 of the pressure of the atmospheres to be measured, whereby the same volume of each of said atmospheres is caused to flow through their respective nozzles at the velocity of sound through said atmosphere to be impinged against said surface of the recording disc with such force that the solid material contained in said surface of the recording disc, and means for moving said recording disc past said nozzles at a constant rate, whereby the solid material in each atmosphere is impregnated into said surface in the form of continuous traces in definitely spaced side by side relation and which traces have sharp edges and are highly resistance to smudging.

6. An apparatus for quantitatively determining the amount of solid material polluting two different atmospheres and for comparing the amount of pollution in each, comprising an airtight chamber, a table rotatably mounted therein, means for rotating said table at a constant and definite rate, a recording disc detachably mounted atop said table to rotate therewith, and having an impregnable, non-tacky, surface, a nozzle in said chamber with its orifice adjacent and directed toward said surface of the recording disc at a point spaced radially of the axis of said recording disc, and having its entrance in communication with one atmosphere to be measured, a second nozzle in said chamber with its orifice adjacent and directed toward said surface of the recording disc, and having its entrance in communication with the second atmosphere to be measured, said second nozzle located in said chamber adjacent said first nozzle but at a different distance radially of said disc than said first nozzle, means for continually evacuating said chamber to reduce and maintain the pressure therein equal to, or less than, .53 of the pressure of the atmospheres to be measured, whereby the same volume of each of said atmospheres are caused to flow through their respective nozzles at the velocity of sound through said atmosphere to be impinged against said surface of the recording disc with such force that the solid material contained therein is impregnated into said surface, and means for rotating said table and recording disc thereon at a constant given rate past said nozzles, whereby the solid material in each atmosphere is impregnated into said surface of the recording disc to form continuous traces in definitely spaced side by side relation and which traces have sharp edges and are highly resistant to smudging.

7. In the method of determining the amount of polution in an atmosphere by causing the atmosphere to pass through a restricted opening and impinging the same onto an impregnable substantially non-tacky, surface, the step of creating at least a 53 per cent pressure drop through said opening whereby a constant given volume of the atmosphere passes through said opening and is impinged onto said surface at the velocity of sound through said atmosphere.

8. In the method of continuously determining the amount of pollution in an atmosphere by causing the atmosphere to pass through a restricted opening and impinging the same onto an impregnable substantially non-tacky surface passed in front of said opening, the step of creating and maintaining at least a 53 per cent pressure drop through said opening whereby a given volume of the atmosphere passes through said opening per unit of time and is impinged onto said surface at the velocity of sound through said atmosphere.

9. In the method of continuously determining the amount of polution in an atmosphere by causing the atmosphere to pass through a restricted opening and impinging the same onto an impregnable substantially non-tacky surface passed in front of said opening, the step of reducing the pressure on the exit side of said opening to, and maintaining the pressure at, a value equal to, or less than, .53 of the pressure at the entrance side of said opening, whereby a constant given volume of the atmosphere passes through said opening and is impinged onto said surface at the velocity of sound through said atmosphere.

10. In the method of continuously quantitatively analyzing the amount of solid material in an atmosphere by causing the atmosphere to flow through a restricted orifice into an enclosed area and impinging the same onto an impregnable substantially non-tacky surface passed in front of said nozzle, the step of continuously evacuating said enclosed area to reduce the pressure therein to a value equal to, or less than, .53 of the pressure at the entrance side of the orifice, whereby a constant given volume of the atmosphere passes through said orifice, and is impinged onto said surface at the velocity of sound through said atmosphere.

11. The method of continuously quantitatively comparing the amount of pollution in two separate atmospheres by causing each of said atmospheres to pass through a separate restricted orifice of the same size and impinging the same onto an impregnable substantially non-tacky surface, the step of creating and maintaining a pressure drop through each of said orifices equal to, or greater than, .53 of the pressure of the atmosphere at the entrance side of said orifices, whereby the same volume of atmosphere passes through each of said orifices in a given unit of time and is impinged onto said surface at the velocity of sound through said atmospheres.

12. The method of continuously quantitatively comparing the amount of solid material polluting two separate atmospheres by causing each of said atmospheres to pass through a separate restricted orifice of the same size into an enclosed area and impinging the same onto an impregnable substantially non-tacky surface, the step of continuously evacuating said enclosed area to reduce the pressure therein to a value to create at least a 53 per cent pressure drop through each of said orifices, whereby the same volume of atmosphere passes through each of said orifices in a given unit of time and is impinged onto said surface at the velocity of sound through said respective atmospheres.

ALFRED C. ROBERTSON.